(12) United States Patent  
Olien

(10) Patent No.: US 8,109,680 B2  
(45) Date of Patent: Feb. 7, 2012

(54) MOUNTING DEVICE, SYSTEM AND METHOD

(76) Inventor: Michael A Olien, Tomball, TX (US)

( * ) Notice: Subject to any disclaimer, the term of this patent is extended or adjusted under 35 U.S.C. 154(b) by 0 days.

(21) Appl. No.: 12/711,615

(22) Filed: Feb. 24, 2010

(65) Prior Publication Data

US 2010/0215355 A1    Aug. 26, 2010

Related U.S. Application Data

(60) Provisional application No. 61/154,894, filed on Feb. 24, 2009.

(51) Int. Cl.  
*G03B 17/00* (2006.01)

(52) U.S. Cl. ........................................ 396/428

(58) Field of Classification Search ............ 396/427–428  
See application file for complete search history.

(56) References Cited

U.S. PATENT DOCUMENTS

| | | | |
|---|---|---|---|
| 6,293,676 B1 * | 9/2001 | Holway | 352/243 |
| 6,449,431 B1 * | 9/2002 | Cuddeback et al. | 396/27 |
| 6,623,182 B2 | 9/2003 | Tatera | |
| 6,679,467 B1 * | 1/2004 | Softness | 248/278.1 |
| 7,149,422 B2 * | 12/2006 | Schnell | 396/153 |
| 2003/0133708 A1 | 7/2003 | Tatera | |
| 2007/0034764 A1 * | 2/2007 | Dittmer et al. | 248/324 |
| 2008/0107413 A1 * | 5/2008 | Moore et al. | 396/428 |
| 2008/0236858 A1 * | 10/2008 | Quijano | 174/50 |
| 2009/0010637 A1 * | 1/2009 | DeWitt | 396/428 |
| 2009/0129769 A1 | 5/2009 | Broberg | |

* cited by examiner

*Primary Examiner* — Clayton E Laballe  
*Assistant Examiner* — Dennis Hancock  
(74) *Attorney, Agent, or Firm* — John K. Buche; Buche & Associates, P.C.

(57) ABSTRACT

The present application is directed to a device for securing an object to a mountable surface. The device is configured to face the object secured thereto in any direction up to 360 degrees about the mountable surface. The device comprises a mating surface securable to the mountable surface via a tamper proof locking means and a support attached to the mating surface that is operationally configured to secure the object thereto.

10 Claims, 10 Drawing Sheets

MOUNTING DEVICE, SYSTEM AND METHOD

CROSS-REFERENCE TO RELATED APPLICATIONS

This application claims the benefit of U.S. provisional patent application No. 61/154,894, filed on Feb. 24, 2009.

STATEMENT REGARDING FEDERALLY SPONSORED RESEARCH OR DEVELOPMENT

Not applicable.

FIELD OF THE APPLICATION

The application relates generally to a device for mounting objects to mounting surfaces.

BACKGROUND

Items such as electronic surveillance equipment and the like are often positioned in strategic or remote locations and thereafter left unattended. Unless the equipment is securely fixed to a particular surface or other article, the equipment is subject to theft or damage by persons or wildlife. For example, game or hunting type cameras are typically attached to trees or posts via straps or common screw type devices making trail hunting cameras susceptible to unwanted removal by persons or wildlife.

A need exists for protecting against the unwanted removal of such devices.

SUMMARY

The present application is directed to a device for securing an object to a mountable surface. The device is configured to face the object secured thereto in any direction up to 360 degrees about the mountable surface. The device comprises a mating surface securable to the mountable surface via a tamper proof locking means and a support attached to the mating surface that is operationally configured to secure the object thereto.

The present application is also directed to a device for securing a trail camera to a male type mating surface. The device comprises a tamper proof female type mating surface and a means for supporting the trail camera in a desired orientation up to about 360 degrees about the mountable surface.

The present application is also directed to a system for securing an object to a mountable surface. The system comprises (a) a post, (b) a mounting device operationally configured to (1) mate with the post and (2) support the object in a desired orientation in any direction up to 360 degrees about the post; and (c) a means for tethering the object to the mounting device.

The present application is also directed to a method for securing an object to a pre-existing fence post. The method comprises the steps of: (a) providing a device having a tamper proof female type mating surface for mating to the post, a means for supporting the trail camera in a desired orientation up to about 360 degrees about the mountable surface, and a means for tethering the object to said device; (b) identifying a desirable fence post; (c) slipping the device over the top of the post; (d) applying a biasing means to secure the female type mating surface of the device to said post; (e) locking the object to the device via said tethering means.

BRIEF DESCRIPTION

Figure 1:
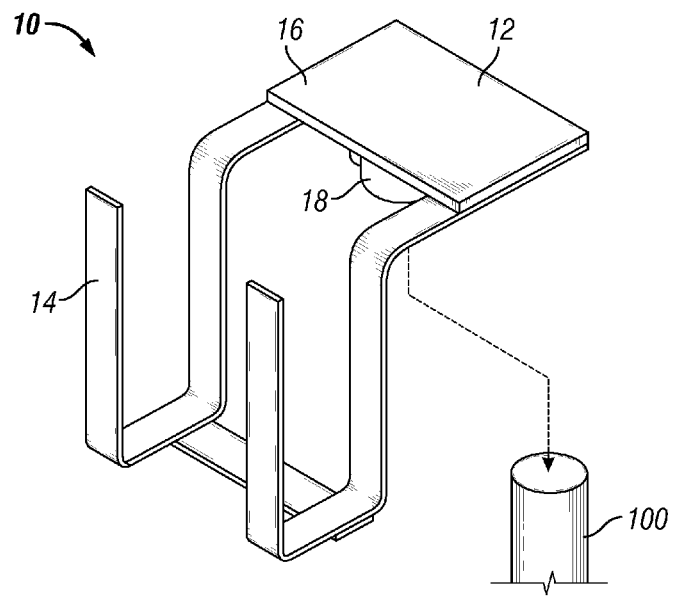
FIG. 1 is a perspective environmental view of an embodiment of the mounting device of this application.

It has been discovered that electronic surveillance equipment, trail cameras and other items may be left in remote or otherwise unattended locations by securing such equipment to posts including T-posts using the present mounting devices. In addition, the present mounting devices are operationally configured to position or otherwise orient the equipment as desired during use. Heretofore, such a desirable achievement has not been achieved in the manner of this invention. Accordingly, the devices, systems and methods of this application measure up to the dignity of patentability and therefore represent patentable concepts.

Before describing the invention in detail, it is to be understood that the present system and method are not limited to particular embodiments. It is also to be understood that the terminology used herein is for the purpose of describing particular embodiments only, and is not intended to be limiting. As used in this specification and the appended claims, the phrase "electronic surveillance equipment" includes, but is not necessarily limited to cameras, video recordable technology, audio recordable technology, light sources, laser surveillance systems, and infrared illuminators. The phrase "trail camera" herein refers to hunting or game surveillance cameras having weather-resistant, airtight camera housings. Examples of commercial sources for trail cameras include: Bushnell Corporation, Overland Park, Kans., USA; Non Typical, Inc., Green Bay, Wis., USA; Stealth Cam, LLC, Grand Prairie, Tex.; and Predator Trail Cams, Saxon, Wis., USA.

In one aspect, the application provides a mounting device usable with an arced post. In another aspect, the mounting device is usable with a non-arced post.

In another aspect, the application provides a mounting device usable with a T-post, the T-post pre-existing at a particular location for an unrelated purpose or provided with the mounting device at the time of installation of the device.

In another aspect, the application provides a mounting device usable with an arced post, the post pre-existing at a particular location for an unrelated purpose or provided with the mounting device at the time of installation of the device.

In another aspect, the application provides a mounting device including a tamper proof means for securing the mounting device to a target post.

In another aspect, the application provides a mounting device securable to a target post, wherein at least part of the device being pivotable about the target post.

In another aspect, the application provides a mounting device operationally configured to tilt an item secured thereto up to about 180 degrees about its mounting surface.

In another aspect, the application provides a mounting device securable to a target post, wherein at least part of the device is rotatable about the target post.

In another aspect, the application provides a mounting device operationally configured to rotate an item secured thereto up to 360 degrees about a target post.

In another aspect, the application provides a mounting device operationally configured to be oriented about a target post up to 360 degrees.

In another aspect, the application provides a mounting device operationally configured to orient an object secured thereto about a target post up to 360 degrees.

In another aspect, the application provides a mounting device operationally configured to be releasably secured to arced and non-arced posts.

In another aspect, the application provides a mounting system comprising a post having a particular surface configuration and a mounting device having a surface configuration operationally configured for releasable securement of the mounting device with the post.

In another aspect, the application provides a mounting device comprising a mating surface for mating to an end of a post.

In another aspect, the application provides a mounting device operationally configured to secure a trail scouting camera to a post, including a T-post.

In another aspect, the application provides a mounting device including an aperture for mating with a target post, the aperture comprising a shape substantially similar to the surface configuration of the target post.

In another aspect, the application provides a system for mounting an object to a target post, the system including a means for locking the object to a mounting device, and a means for securing the mounting device to the target post.

In another aspect, the application provides a mounting device including a basket-type member for receiving a trail camera.

In another aspect, the application provides a mounting device including an "H" shaped aperture therethrough, the aperture being operationally configured to receive a T-post.

In another aspect, the application provides a mounting device including a "T" shaped aperture therethrough, the aperture being operationally configured to receive a T-post.

In another aspect, the application provides a mounting device including an "I" shaped aperture therethrough, the aperture being operationally configured to receive a T-post.

In another aspect, the application provides a mounting device including a means for tethering an object to the mounting device.

In another aspect, the application provides a mounting device including a tree mounting surface.

In another aspect, the application provides a mounting device including a biasing fastener for securing the device to a surface.

In another aspect, the application provides a slip-over mounting device that may be simply placed onto an end of a post, such as a fence post.

In another aspect, the application provides a device for hanging a trail camera from a post, pole or the like.

In another aspect, the application provides a means for tilting and maintaining a trail camera in a particular direction.

In another aspect, the application provides a mounting device that may be welded to a mounting surface.

In another aspect, the application provides a device with an aperture therethrough, the inner dimensions of the aperture being substantially similar to the outer dimensions of a static structure to be directed through the aperture.

In another aspect, the application provides a system for detecting motion in an unmanned location or environment, the system including: (1) a post or pole, (2) a mounting device operationally configured to mate with post, and (3) a camera securable to the mounting device.

In another aspect, the application provides a system for detecting motion in an unmanned location or environment, the system including: (1) a post or pole, (2) a mounting device operationally configured to mate with post, the mounting device being securable to the post, (3) a camera supported by the mounting device, and (4) a cable and padlock for securing the camera to the mounting device.

DISCUSSION OF THE DEVICES, SYSTEMS AND METHODS

In one simplified embodiment, the invention provides a device for securing objects like trail cameras to mountable surfaces. Suitably, the device may include: a (1) mating surface, and (2) a support attached thereto. The mating surface of the device is securable to a mountable surface via a tamper proof locking means. The support is operationally configured to secure the intended object thereto.

To better understand the novelty of the devices, systems, and methods of use thereof, reference is hereafter made to the accompanying drawings. With reference to FIG. 1, an exemplary mounting device 10 securable to a mountable surface 100 is provided. For simplicity, the mountable surface 100 will be described throughout in terms of a post extending above grade, although other similar shaped surfaces may be employed. Suitable mountable surface 100 include static structures and transportable structures including, but not necessarily limited to fence posts, sign posts, tree branches, piping, rebar, coil rod and other male type mating surfaces.

In this embodiment, the mounting device 10 includes (1) a base 12 operationally configured to mate with a post 100 such as a fence post, and (2) a cradle 14 extending from the base 12, the cradle 14 being operationally configured to receive and support an object thereto. Suitably, the base 12 includes a tamper proof locking means operationally configured to slip over onto the end of a post 100 and secure the mounting device 10 to the post 100. The cradle 14 suitably lies adjacent the length of the post 100 and is operationally configured to secure the intended object thereto. For simplicity, the application will discuss the mounting device 10 in terms of receiving, supporting and securing a trail camera 150, although the mounting device 10 may support other objects such as electronic surveillance equipment as discussed above.

In this embodiment, the base 12 is defined by a one piece member having a first surface 16 and a second surface 17, the second surface 17 further including the tamper proof locking means of the invention. The tamper proof locking means is provided in the form of an assembly including a first a receiver 18 extending from the second surface to form a female type mating surface for mating with a post 100. In one embodiment, the receiver 18 may include a continuous wall type perimeter (see FIG. 2A). In another embodiment, the receiver 18 may include two or more sections forming a female type mating surface therein (see FIG. 4B).

In one embodiment, the receiver 18 may form an arced inner surface. In another embodiment, the inner surface of the receiver 18 may be multi-sided or take a non-standard form, e.g., star shaped, etc. Regardless of the inner surface configuration, a suitable receiver 18 is operationally configured to receive one or more shapes of posts 100 therein. Although the mounting device 10 may be built to scale, in embodiments designed to work in conjunction with fence posts such as T-posts, a suitable receiver 18 may range in length from about 3.0 inches to about 6.0 inches (7.62 cm to about 15.24 cm).

Figure 2A:
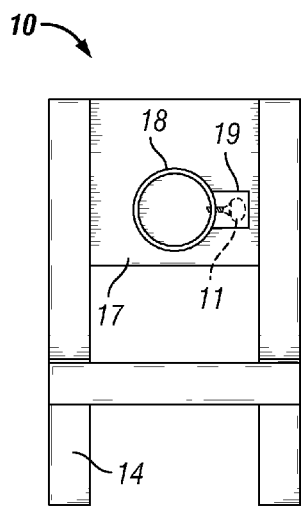
FIG. 2A is a bottom view of an embodiment of the mounting device.

As shown in FIG. 1, the mounting device 10 may be rotated about the receiver 18 and oriented up to 360 degrees about the post 100 to face in a desired direction. In addition, a suitable receiver 18 is effective to maintain the mounting device 10 in a mated position during use. For example, the inner surface of the receiver 18 is shaped to form a snug fit with a corresponding post 100. For example, where the intended mounting surface is a round fence post 100, a suitable receiver 18 has a circular inner surface including an inner diameter substantially similar to the outer diameter of the post 100. FIG. 2A is representative of a receiver 18 operationally configured to mate with a round post 100—the inner diameter of the receiver 18 determining the maximum outer diameter of a corresponding post 100 received therein. The same is true when mating a rectangular receiver 18 with a rectangular post 100. In addition, it is further contemplated that where the receiver 18 has two or more separate sections (FIG. 4B), a part of the mountable surface 100 may extend beyond the perimeter of the receiver 18 between two or more of the sections, e.g., a "+" shaped post 100 and a four-sectioned circular receiver 18.

Suitably, the side wall of the receiver 18 includes an aperture there through for receiving a security fastener 11 that may be biased against the post 100 securing the mounting device 10 thereto. The security fastener 11 represents a biasing means aspect of the tamper proof locking assembly. Although not necessarily limited to a particular embodiment, a suitable security fastener 11 is defined by an article having a longitudinal axis and a mating head configured to receive a corresponding tool for tightening/loosening the security fastener 11. For example, the security fastener 11 may include a bolt, pin, screw, or like device having a cavity head or other head configuration for receiving a particular tool. In a particularly advantageous embodiment, a specialized security fastener 11 may be employed requiring a particular tool to tighten/loosen the security fastener 11. Suitable specialized security fasteners 11 include, but are not necessarily limited to tamper proof screws such as snake eyes spanner screws, Phillips head pin screws, torx pin head screws, tri-wing screws, triangular screws, hex socket drive screws, pan head screws, flat head screws, button head screws, and socket pin-head screws. In a particularly advantageous embodiment, the security fastener 11 includes a pan head hex pin requiring a hex bit tip with bit tip insert or hand driver to operate. Suitable specialized security fasteners 11 may be constructed from metals including for example brass, carbon steel, stainless steel, alloy steel.

Figure 2B:
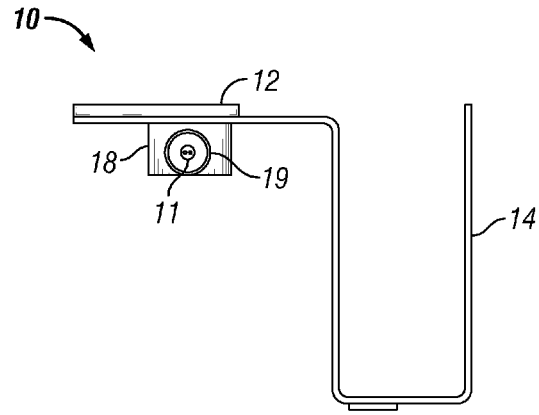
FIG. 2B is a right side view of an embodiment of the mounting device.

During operation, the security fastener 11 may be directed through the receiver 18 aperture to a sunk position clear of the outer surface of the receiver 18. As such, the outer edge or head of the security fastener 11 is surrounded by the side wall of the receiver restricting access to the security fastener 11 from the side. In the embodiment of FIGS. 2A and 2B, the receiver 18 may include a lock guard 19 surrounding the aperture and security fastener 11 located therein. In operation, the lock guard 19 is operationally configured to prevent unauthorized access to the security fastener 11. As shown, the lock guard 19 suitably extends from the outer surface of the receiver 18 forming a barrier that prevents or limits access to a security fastener 11 from its side. Similar to the receiver, the lock guard 19 may include a continuous wall type perimeter or may include two or more sections effectively surrounding the aperture and security fastener 11 located therein. Although not necessarily limited to a particular configuration, the longitudinal axis of the lock guard 19 is substantially perpendicular to the longitudinal axis of the receiver 18.

In absence of the lock guard 19, the security fastener 11 (even a specialized security fastener) may be subject to manipulation from its side via commercially available tools or instruments, including but not necessarily limited to wrenches, pliers, screw drivers, hammers, chisels, files, pocket knifes, and the like. Thus, the lock guard 19 is suitable for securing expensive items such as trail cameras where potential thieves and vandals are likely to stumble upon such items in forests and the like where such persons are less likely to be carrying specialized tools designed to work with a specialized security fastener 11. Nor will the individual be able to use basic hand tools at his/her disposal to tamper with the security fastener 11 in light of the lock guard 19. However, if no lock guard 19 is provided, using a specialized security fastener 11 is still effective to provide a certain degree of protection against unauthorized access.

An apposite cradle 14 is operationally configured to receive an object that has a substantially similar outer surface as the cradle's inner surface—forming a secure fit as desired. Thus, the present cradle 14 configuration may be altered depending on the object to be received and supported therein. It is also contemplated that the cradle 14 may be constructed from bendable material(s) capable of being shaped to receive different objects as desired. Thus, an advantageous feature of the present mounting device 10 includes the ability to configure the cradle 14 to receive, support, and secure one or more particular objects thereto. For example, as new trail cameras become commercially available, a particular cradle 14 may be configured to receive and support one or more particular trail camera models or a particular brand of trail cameras.

Figure 3:
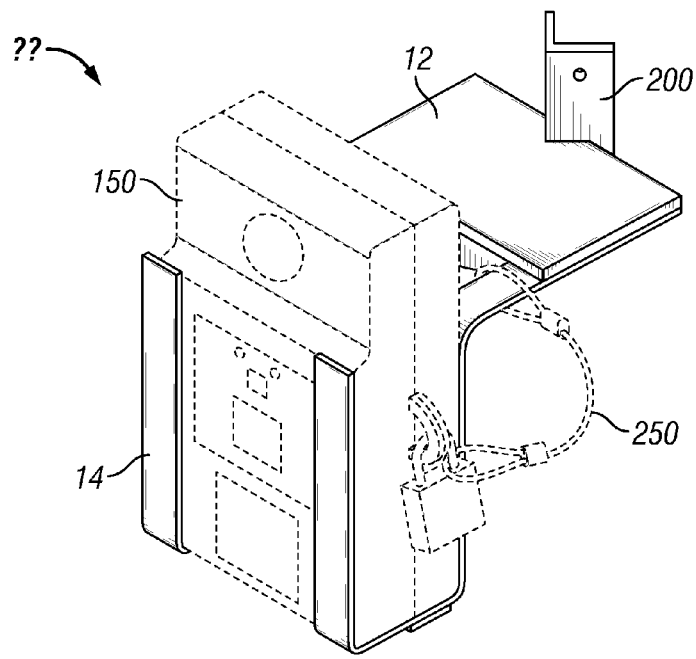
FIG. 3 is a perspective view of an embodiment of the mounting device including a phantom view of a trail camera secured thereto.

FIG. 3 is illustrative of an embodiment of a mounting device 10 having a cradle 14 configured to support a trail camera 150 therein. A suitable cradle 14 is operationally configured to maintain a trail camera 150 in a desired orientation during use. As shown, the cradle 14 may comprise forked members operationally configured to support a trail camera 150 in a desired orientation by forming a receptacle type receiver for holding the trail camera 150 therein. In other receptacle type embodiments, the cradle 14 may include a basket type configuration or a bowl type configuration. The mounting device 10 may also include a backing bracket 200 suitable for bracing the mounting device 10 against trees, poles and other surfaces as desired. A suitable backing bracket 200 may be constructed from angle iron. Also, a tethering means 250 may be utilized to secure a trail camera 150 or other object to the mounting device 10 as desired. In a simplified embodiment, the tethering means 250 may include a cable or chain and a lock 251, such as a padlock.

Figure 4A:
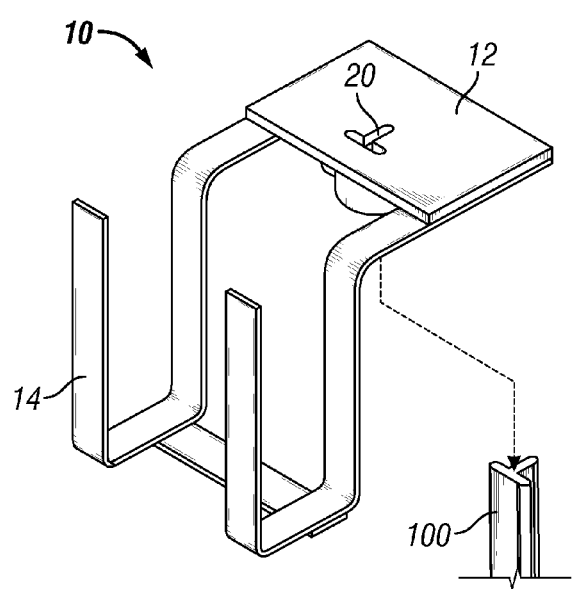
FIG. 4A is a perspective environmental view of an embodiment of the mounting device operationally configured to secure to a T-post.
Figure 4B:
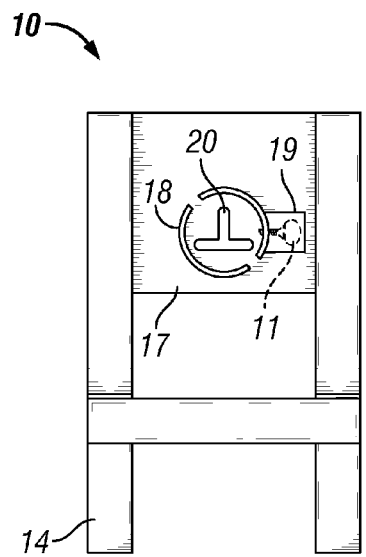
FIG. 4B is a bottom view of an embodiment of the mounting device operationally configured to secure to a T-post.

Other embodiments of the mounting device 10 may include a base 12 further comprising an aperture 20 there through, the aperture 20 being operationally configured to mate with a particular shaped post 100. For example, a mounting device 10 for mating with a T-Post 100 suitably includes a "T" shaped aperture 20 there through—as depicted in FIGS. 4A and 4B. Here, the T-shaped aperture 20 may receive a particular length of the T-post 100 there through, which assists in stabilizing the mounting device 10 during use. In this simplified embodiment, the mounting device 10 is suitable for facing in a particular direction as determined by the orientation of the T-post 100 above grade. Thus, where a user is providing both the T-post 100 and the mounting device 10, the user may orient the T-post 100 in a manner effective to intentionally face the mounting device 10 (and trail camera 150) in a particular direction. If the mounting device 10 is to be used with a pre-existing T-post 100, e.g., along a fence line, then use of the mounting device 10 is limited by the orientation of such T-post 100.

Figure 5A:
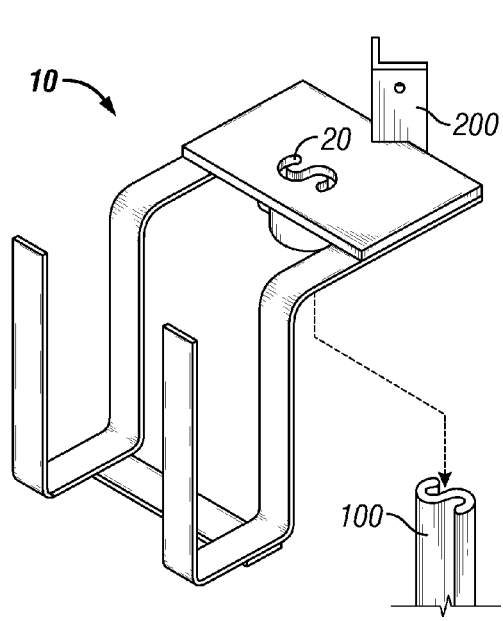
FIG. 5A is a perspective environmental view of an embodiment of the mounting device operationally configured to secure to an S shaped post.
Figure 5B:
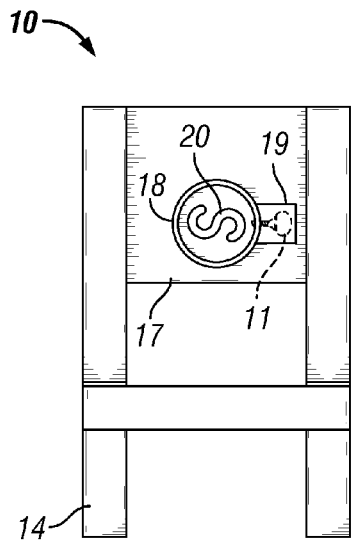
FIG. 5B is a bottom view of an embodiment of the mounting device operationally configured to secure to an S shaped post.

In other embodiments, the aperture 20 may comprise an "H" shape or an "I" shape—each of which are also operationally configured to receive a T-post 100 there through. In still other embodiments, the aperture 20 may include a shape effective to receive a particular post 100 configuration there through. For example, the aperture 20 of FIG. 5 comprises an "S" shape effective to receive a corresponding "S" shaped post 100 there through. In another embodiment, the aperture 20 may be "U" shaped for receiving a "U" shaped post therethrough.

Figure 6A:
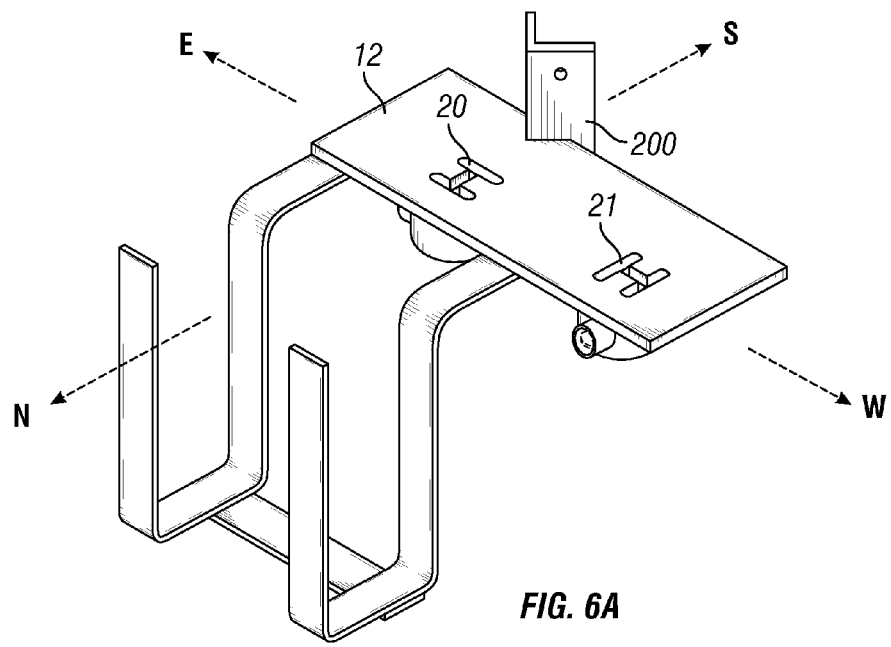
FIG. 6A is a perspective view of another embodiment of the mounting device having two apertures for receiving a male type mating surface including a T-post.
Figure 6B:
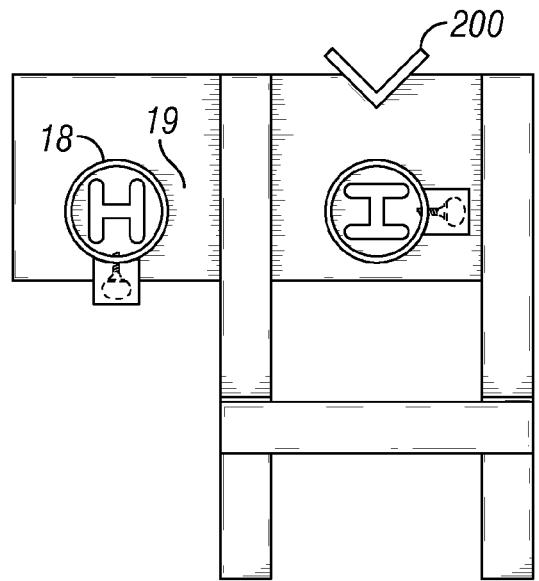
FIG. 6B is a bottom view of the embodiment of the mounting device of FIG. 6A.

Turning to FIG. 6A, the base 12 may also be configured to include two or more apertures there through effective for increasing the optional orientations of the mounting device 10 atop one or more particular posts 100. For example, a base 12 may comprise two "T" shaped apertures oriented either 90 degrees or 180 degrees relative to the other. In another embodiment, the base 12 may comprise two non-similar aperture shapes increasing the types of posts available for attachment. For example, a first aperture may be "T" shaped and a second aperture "S" shaped, "U" shaped, etc. Suitably, the second aperture 21 includes a tamper proof locking assembly similar to the first aperture 20 (see FIG. 6B).

In the embodiment of FIG. 6A, the first aperture 20 comprises an "I" shape, and the second aperture 21 comprises an "H" shape (a 90 degree rotation of the "I" shaped first aperture 20). Assuming a particular orientation of the T-post 100, the first aperture 20 is effective for aligning the cradle 14 in either a north or south direction, whereas the second aperture 21 is effective for aligning the mounting device in either a east or west direction—360 degree orientation.

Figure 7A:
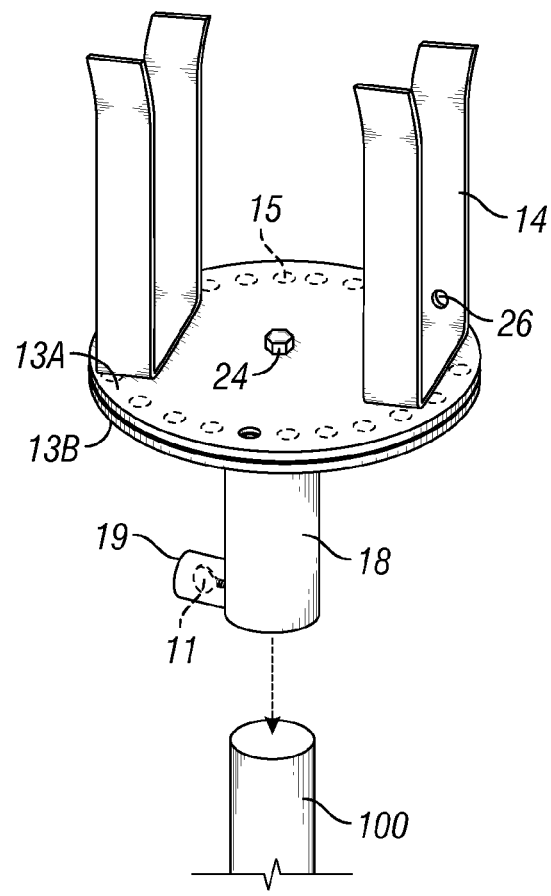
FIG. 7A is a perspective environmental view of another embodiment of the mounting device operationally configured to rotate about a post type support surface up to 360 degrees.
Figure 7B:
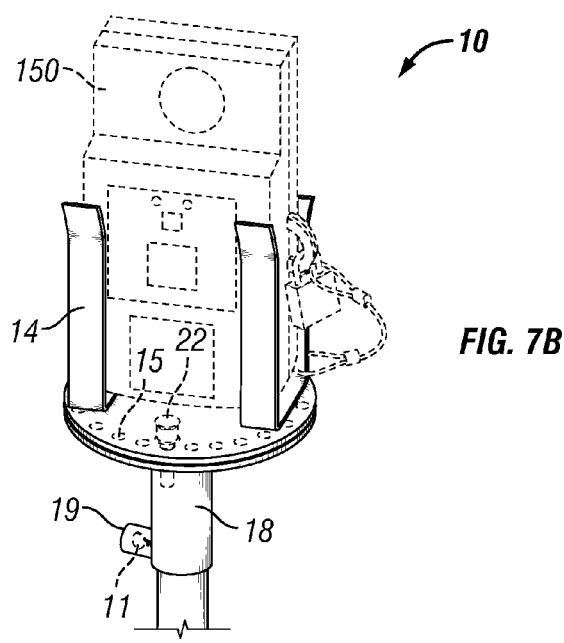
FIG. 7B is a perspective view of the embodiment of FIG. 7A including a phantom view of a trail camera secured thereto.

Another embodiment of the mounting device 10 providing for 360 degree alignment is depicted in FIGS. 7A and 7B. In similar fashion to embodiment described previously, the receiver 18 of the tamper proof locking assembly is operationally configured to slip onto the end of a post 100 where after the mounting device 10 may be secured to the post 100 via the security fastener 11 of the tamper proof locking assembly.

In this particular embodiment, the base 12 is disposed between the cradle 14 and the receiver 18 whereby the cradle 14 rests at a point beyond the edge of the post 100 during operation. Here, the base 12 acts as a support surface for the cradle 14. Suitably, the base 12 includes two planar members 13A and 13B, the first planar member 13A being rotatable about the second planar member 13B according to the center axis member 24 to orient the cradle 14 in any direction up to 360 degrees about the post 100. Suitably, the planar members 13A, 13B comprise alignment holes 15 wherein once the first planar member 13A is rotated and the cradle 14 positioned as desired, a pin 22 or other object may be inserted through corresponding alignment holes 15 of the planar members 13A, 13B holding the planar members and cradle 14 in a fixed position. The second planar member 13B suitably includes at least a first hole 15, but may include either a greater number of holes 15 or fewer holes than the number of holes 15 of the corresponding first planar member 13A.

The alignment holes 15 represent intervals including a sweep angle ranging from zero degrees up to 360 degrees. In one suitable embodiment, the alignment holes 15 are configured to represent degree intervals ranging from about 1 degree up to about 360 degrees. In one particularly advantageous embodiment, the holes 15 are configured to represent forty-five degree intervals. In another particularly advantageous embodiment, the holes 15 are configured to represent 180 degree intervals. In another particularly advantageous embodiment, the holes 15 are configured to represent fifteen degree intervals. In other embodiments, the alignment holes 15 may be spaced non-uniformly as desired.

Accordingly, the possible orientations for the cradle 14 (and trail camera 150 supported therein) may be determined by (1) the number of alignment holes 15, (2) the spacing or degree intervals between adjacent holes 15, (3) the orientation of the fixed alignment holes 15 on the second planar member 13B once the mounting device 10 has been fixed to a post 100, and combinations thereof. The possible orientations for the cradle 14 may be altered even after the planar members 13A, 13B are locked together by simply rotating the mounting device 10 at the receiver 18 as desired. Consequently, the number of alignment holes 15, spacing or degree intervals does not necessarily limit the possible orientations of the cradle 14 (and trail camera 150) about a post 100.

Similar to the other embodiments of the mounting device 10, the embodiment depicted in FIGS. 7A, 7B provides a means for tethering a trail camera 150 or other object to the mounting device 10. As shown in FIG. 7A, the cradle 14 may include a tethering hole 26 for receiving a cable, rope, chain or comparable item. The cable, etc., may be attached to the mounting device 10 at the tethering hole 26 and secured to the trail camera 150 depending on the make and model—most trail camera having a loop type fastener as shown in FIG. 7B. Thus, during operation the trail camera 150 may be guarded from theft via the tethering means 250, and the mounting device 10 may be guarded from theft via the tamper proof locking assembly (the receiver 18, security fastener 11 and lock guard 19).

It is important to note that a trail camera 150 may be secured to a mounting device 10 using methods other than the tethering means 250. For instance, the cradle 14 may be provided in the form of a cage securing the trail camera 150 therein.

Figure 8A:
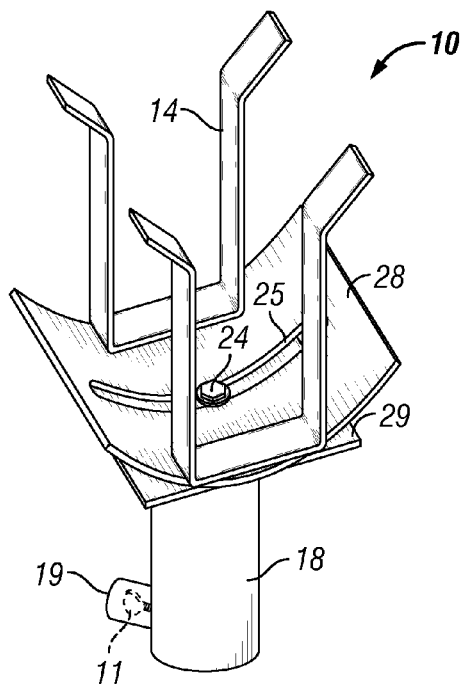
FIG. 8A is another embodiment of the mounting device including a tilting means and rotating means.

Turning to FIG. 8A, another embodiment of the mounting device 10 effective to orient the cradle 14 in any direction up to 360 degrees is provided. As described above, this particular mounting device 10 is too rotatable up to 360 degrees about a post 100 in either direction at the receiver 18. In this particular embodiment, the base 12 includes a curved plate 28 and a flat plate 29 operationally configured for tilting the cradle 14 (and the object housed therein) along a plane substantially parallel to the longitudinal axis of the receiver 18. The curved plate 28 is defined by a slot 25 for receiving the center axis member 24. Likewise, the flat plate 29 includes an aperture substantially centered there through for receiving the center axis member 24—the curved plate 28 being rotatable about the flat plate 29 according to the center axis member 24 thereby orienting the cradle 14 (and trail camera 150) in any direction up to 360 degrees.

The curved plate 28 may be tilted by directing the plate 28 about the center axis member 24 along slot 25. In operation, once the curved plate 28 has been oriented as desired, the center axis member 24, e.g., nut and bolt, may be tightened to hold the curved plate 28 at its desired orientation with respect to the flat plate 29. In another embodiment, the curved plate 28 may be set at a desired orientation, there after the center axis member 24 may be inserted through both the slot 25 and an aperture in the flat plate 29 to bias the curved plate 28 against the flat plate 29—fixing the curved plate 28 at the desired directional alignment and tilting angle of the cradle 14.

Figure 8B:
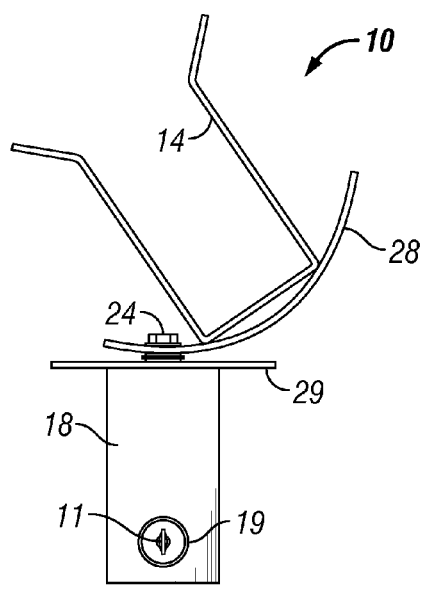
FIG. 8B is a side view of the embodiment of FIG. 8A.
Figure 9A:
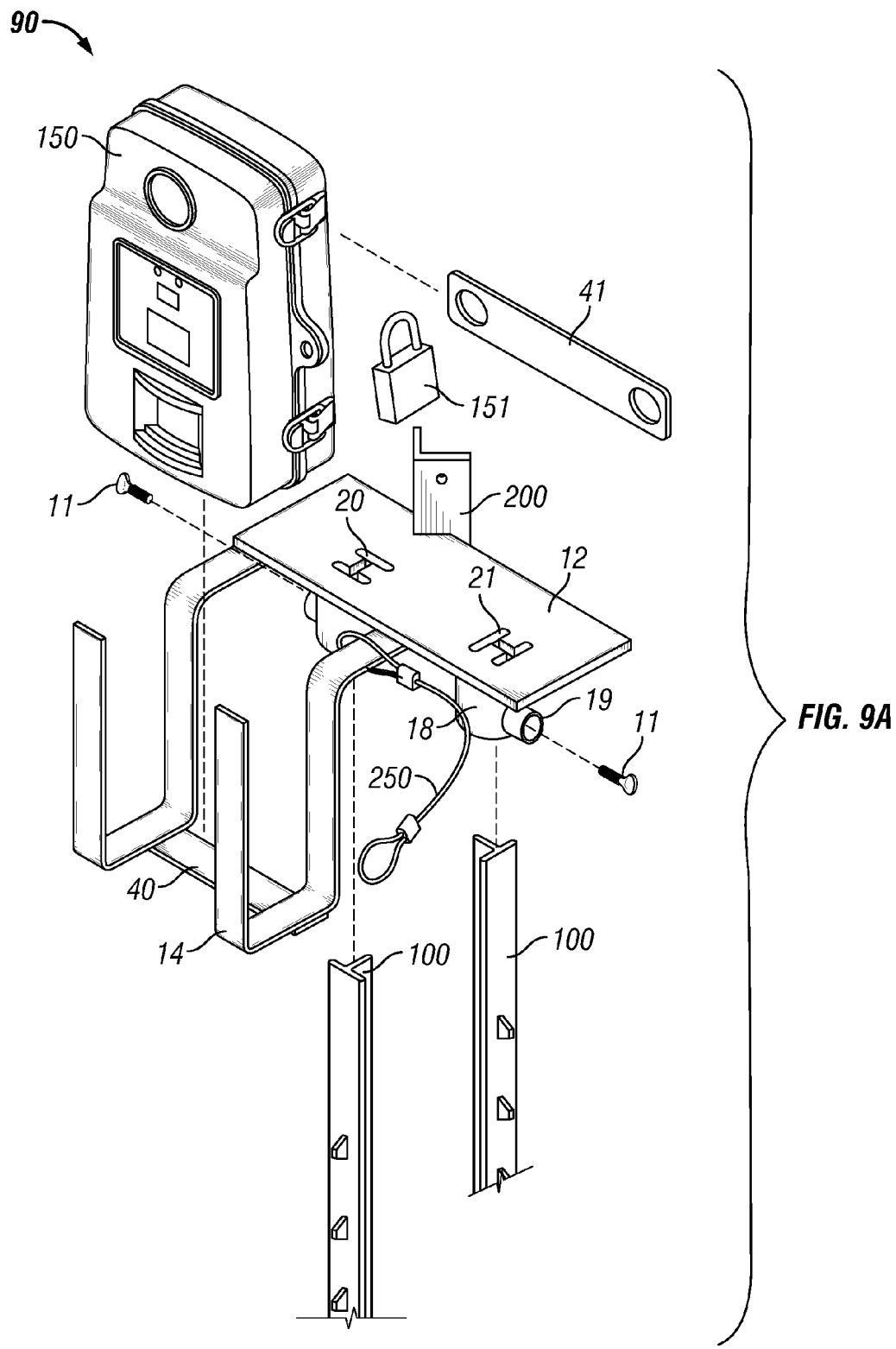
FIG. 9A is an exploded view of a system for securing a trail camera including an embodiment of a mounting device of this application.
Figure 9B:
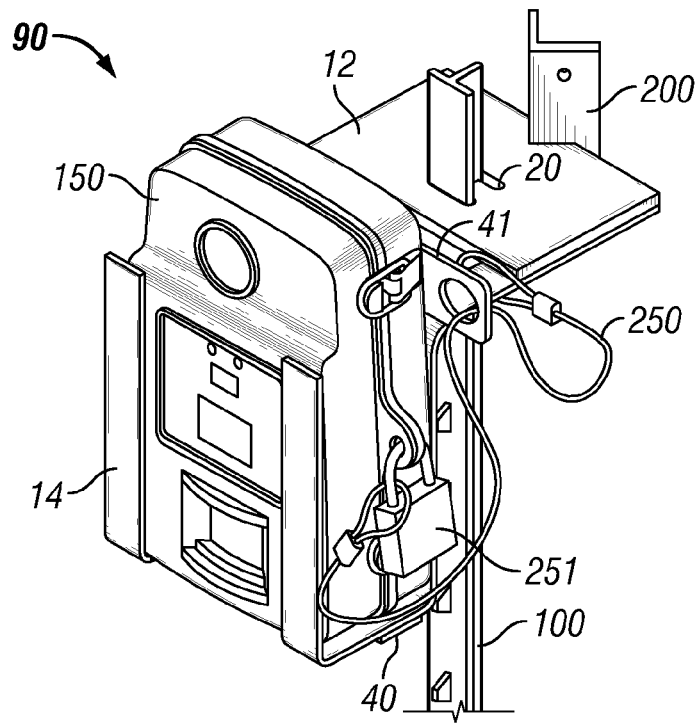
FIG. 9B is a perspective view of the system of FIG. 9A including a trail camera secured to the mounting device.
Figure 9C:
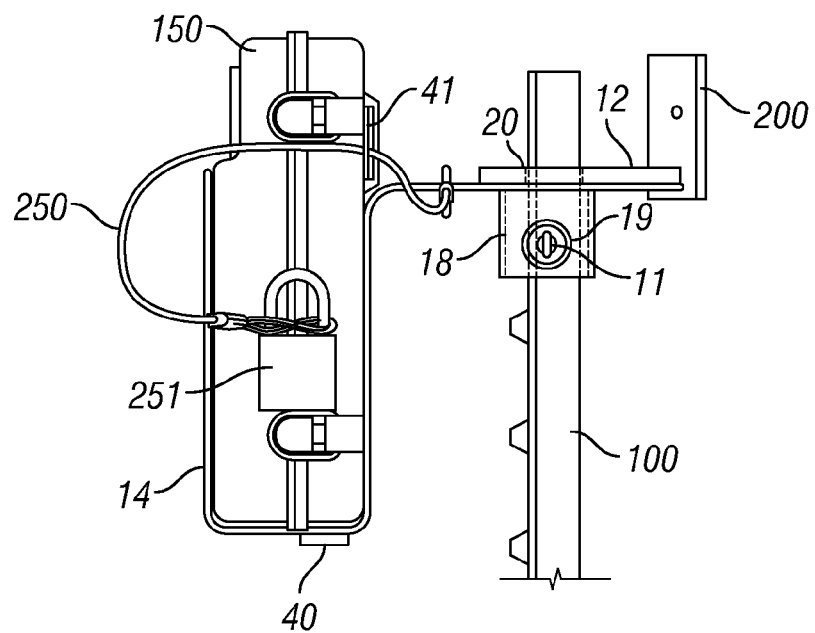
FIG. 9C is a side view of the embodiment of FIG. 9B.

With attention to FIG. 8B, the amount of cradle 14 tilt is dependent on (1) the length of the slot 25, and/or (2) the shape of the curved plate 28. Suitably, the base 12 may be operationally configured to tilt a cradle 14 (and trail camera 150 housed therein) up to about 180 degrees. As shown, the cradle 14 suitably includes U-shaped receiving brackets disposed on opposite sides of the curved plate 28 for receiving a trail camera 150 therein. The empty space between the curved plate 28 and each of the U-shaped receiving brackets may be used to secure a tethering means 250 to the mounting device 10—eliminating the need for a tethering hole 26 as described above.

For purposes of this application, the mounting device 10 is not necessarily limited to any one particular material of construction. However, construction materials may depend on the intended use and/or location of the mounting device 10. Suitably, the mounting device 10 is constructed from one or more materials including, but not necessarily limited to materials resistant to chipping, cracking, and breaking as a result of ozone, weathering, heat, moisture, other outside mechanical and chemical influences, as well as violent physical impacts of varying forces at varying speeds. Suitable materials include, but are not necessarily limited to composite materials, plastics, rubbers, ferrous metals, non-ferrous metals, and combinations thereof.

In one particularly advantageous embodiment, the mounting device 10 is constructed from plastic. In another particularly advantageous embodiment, the mounting device 10 is constructed from aluminum. In another particularly advantageous embodiment, the mounting device 10 is constructed from stainless steel. Both plastic and metal mounting devices 10 may be formed from molds. In another embodiment, plastic and metal mounting devices 10 may be pieced together. For example, metal mounting devices 10 may be mig-welded together.

The mounting device 10 may also comprise an outer protective layer as desired. For example, a mounting device 10 constructed from metal may have an outer coating of paint, for example, a powder coat. In another embodiment, the mounting device 10 may comprise an outer rubber layer. The mounting device 10 may also comprise a camouflage pattern. Furthermore, the mounting device 10 may also be configured to have a camouflage pattern substantially similar to the camouflage pattern of a particular brand of trail camera.

The invention will be better understood with reference to the following non-limiting examples, which are illustrative only and not intended to limit the present invention to a particular embodiment.

Example 1

Figure 10:
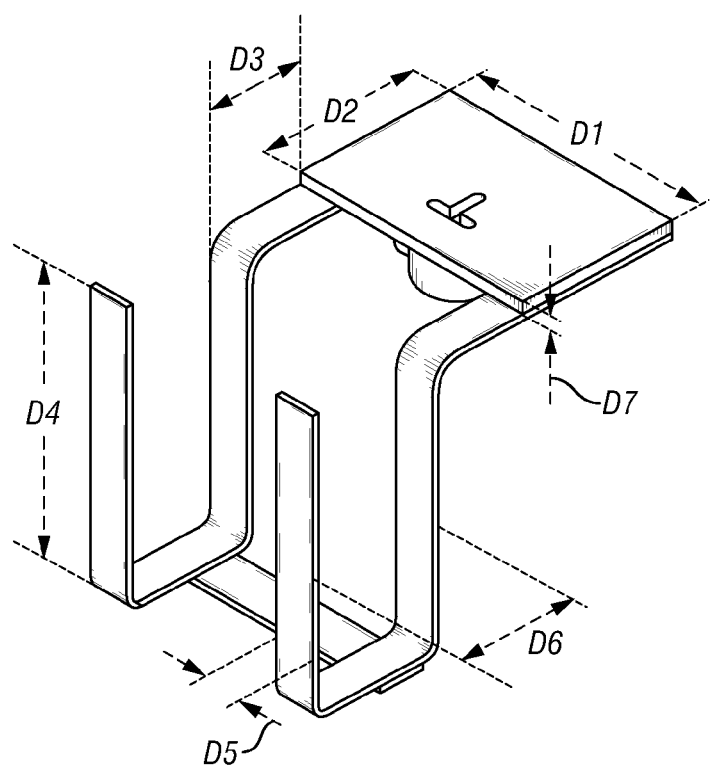
FIG. 10 is a perspective view of an embodiment of the mounting device.
Figure 11:
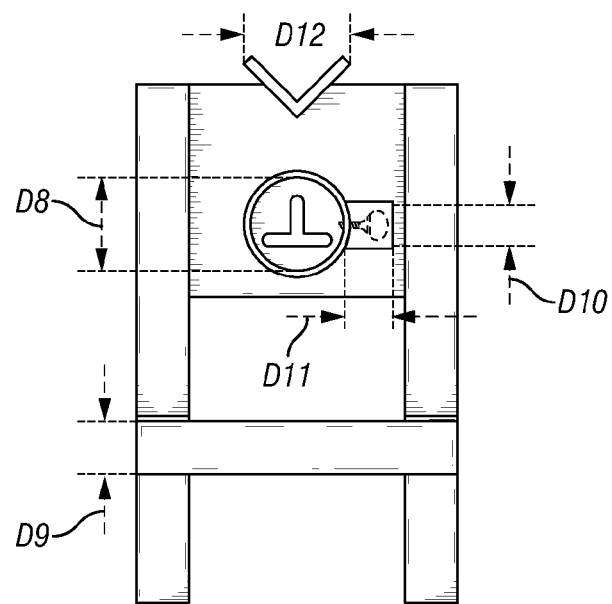
FIG. 11 is a bottom view of the embodiment of FIG. 10.

In a first non-limiting example, a system 90 is provided for securing a trail camera 150 in a remote location (see FIGS. 9A-11). Suitably, the system includes a T-post 100, a mounting device 10 for mating with a T-post, a cable 250, and padlock 251. The mounting device 10 includes the following parts: a base 12 and "T" shaped aperture 20 there through, a receiver 18, a tamper proof lock guard 19, a 7/32"×3/8"×1/2" (5.5 mm×9.5 mm×12.7 mm) pan head hex pin security fastener 11—604 stainless steel, a cradle 14 having a stabilizing bracket 40 and locking plate 41, and a backing bracket 200. With reference to FIGS. 10 and 11, the mounting device 10 includes the following dimensions:

D1: about 6.0 inches (15.2 cm)
D2: about 4.0 inches (10.2 cm)
D3: about 1.0 inches (2.54 cm)
D4: about 7.0 inches (17.8 cm)
D5: about 1.0 inches (2.54 cm)
D6: from about 1.0 to about 5.0 inches (2.54 cm to about 12.7 cm)
D7: about 0.25 inches (0.64 cm)
D8: about 1.5 inches (3.81 cm)
D9: about 1.0 inches (2.54 cm)
D10: about 0.75 inches (1.91 cm)
D11: about 1.0 inches (2.54 cm)
D12: up to about 2.75 inches (6.99 cm)

The length of the receiver 18 may vary, however a receiver 18 suitable for mating with a T-post is about 3.0 inches (7.62 cm) in length.

Example 2

Figure 12:
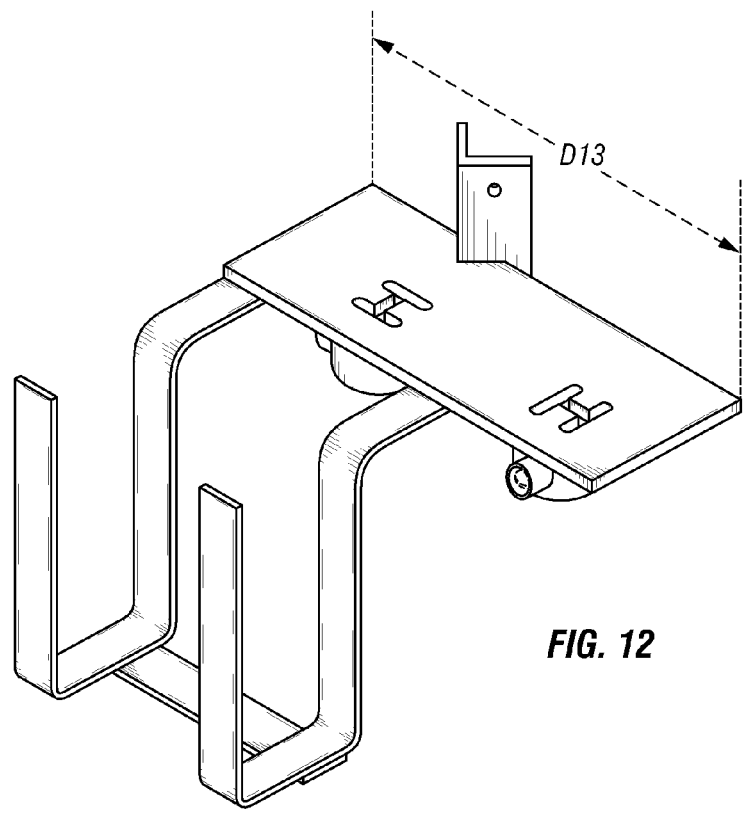
FIG. 12 is a perspective view of an embodiment of the mounting device having two apertures for receiving a male type mating surface including a T-post.

In a second non-limiting example depicted in FIG. 12, a system 90 is provided for securing a trail camera 150 in a remote location. The system 90 includes the same components and same dimensions as Example 1 except for incorporating a different base 12 having two apertures there through: an "I" shaped aperture 20 and an "H" shaped aperture 21. The base 12 includes a width of about 12.0 inches (30.5 cm) represented as D13.

Example 3

Figure 13:
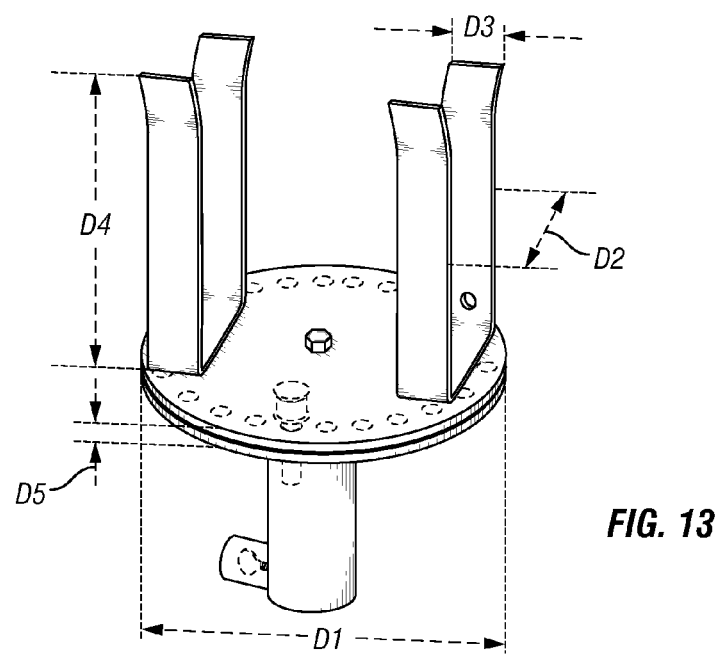
FIG. 13 is a perspective view of an embodiment of the mounting device including a means for rotating the cradle attached thereto up to 360 degrees.

In a third non-limiting example depicted in FIG. 13, a system 90 is provided for securing a trail camera 150 in a remote location. The system 90 includes the same components as Example 1 and incorporates a mounting device 10 having a base 12 effective to orient the cradle 14 in any direction up to 360 degrees. Particular dimensions for this embodiment of the mounting device 10 include:

- D1: about 8.0 inches (20.3 cm)
- D2: from about 1.0 to about 5.0 inches (2.54 cm to about 12.7 cm)
- D3: about 1.0 inches (2.54 cm)
- D4: about 6.0 inches (15.2 cm)
- D5: about 0.5 inches (1.27 cm); each planar member being about 0.125 inches thick (about 0.32 cm)

Example 4

Figure 14:
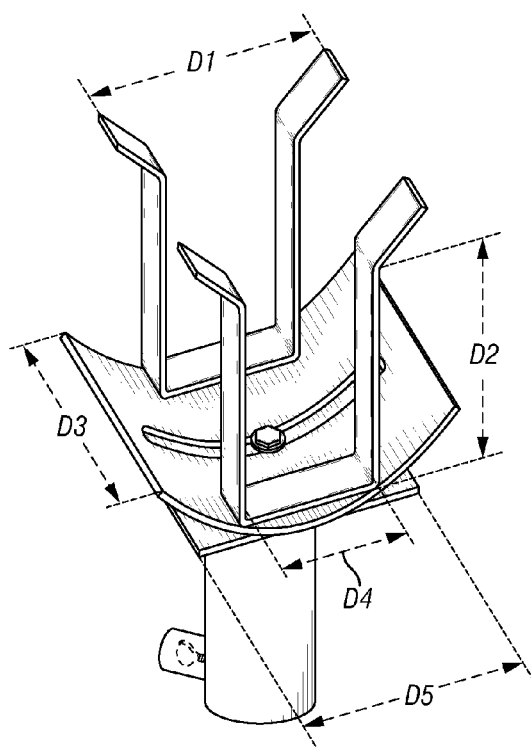
FIG. 14 is a perspective view of an embodiment of the mounting device including a including a tilting means and rotating means.
Figure 15:
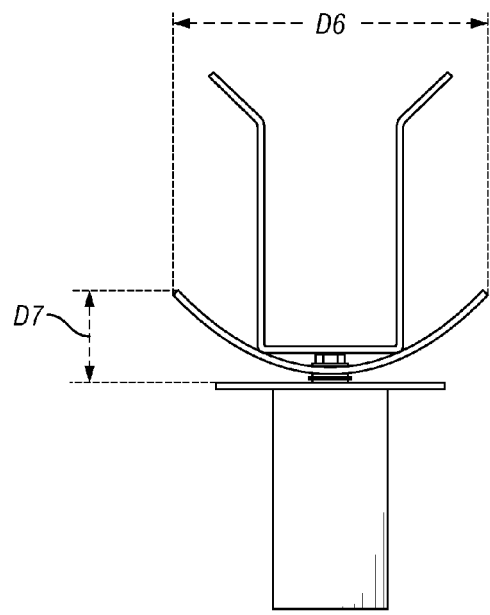
FIG. 15 is a side view of the embodiment of FIG. 14.

In a fourth non-limiting example depicted in FIG. 14, a system 90 is provided for securing a trail camera 150 in a remote location. The system 90 includes the same components as Example 1 and incorporates a mounting device 10 having a cradle 14 that may be both tilted and oriented in any direction up to 360 degrees. The particular dimensions for this embodiment of the mounting device 10 include:

- D1: from about 2.0 to about 6.0 inches (5.1 cm to about 15.2 cm)
- D2: about 5.0 inches (12.7 cm)
- D3: about 6.0 inches (15.2 cm); the curved plate being 6"×6" flat
- D4: from about 1.0 to about 5.0 inches (2.54 cm to about 12.7 cm)
- D5: about 4.0 inches (10.2 cm); the flat plate being 4"×4"
- D6: about 5.0 inches (12.7 cm)
- D7: about 1.5 inches (3.81 cm)

Persons of ordinary skill in the art will recognize that many modifications may be made to the present application without departing from the spirit and scope of the application. The embodiment(s) described herein are meant to be illustrative only and should not be taken as limiting the invention, which is defined in the claims.

I claim:

1. A device for securing an object to a T-post, the device being configured to face the object secured thereto in any direction up to 360 degrees about the T-post, comprising:
   a mating surface including one or more "H" shaped apertures and one or more tamper proof locking means corresponding to the one or more apertures, each aperture being operationally configured to receive the T-post there through, each tamper proof locking means being operationally configured to secure the device to the T-post; and
   a support attached to the mating surface, the support being operationally configured to secure the object thereto;
   wherein the mating surface includes a planar member.

2. The device of claim 1 wherein the tamper proof locking means includes a female type mating surface securable to the T-post via a biasing fastener.

3. The device of claim 2 wherein the tamper proof locking means includes a lock guard extending from the female type mating surface and configured to receive the biasing fastener therein, the longitudinal axis of the lock guard being substantially perpendicular to the longitudinal axis of the female type mating surface.

4. The device of claim 2 wherein at least part of the inner dimensions of the one or more "H" shaped apertures are substantially similar to the outer dimensions of the T-post.

5. The device of claim 2 wherein the biasing fastener is a tamper proof screw.

6. The device of claim 1 wherein the object is a trail camera.

7. The device of claim 6 wherein the trail camera is supported by a receptacle type receiver support.

8. A system for securing an object to a T-post, comprising:
   a mounting device including (1) a mating surface including a planar member having one or more apertures there through, each aperture being operationally configured to receive the T-post there through, and (2) a support attached to the planar member, the support being operationally configured to secure the object thereto; and
   a means for tethering the object to the mounting device;
   wherein the one or more apertures include an "H" shape.

9. The system of claim 8 wherein the mounting device comprises a tamper proof locking means including a female type mating surface for receiving the T-post there through.

10. A method for securing a trail camera to a pre-existing fence T-post comprising:
    providing a device having (1) a mating surface including a planar member including one or more apertures and one or more tamper proof locking means corresponding to the one or more apertures, each aperture being operationally configured to receive the T-post there through, each tamper proof locking means having a female type mating surface for receiving the T-post, the tamper proof locking means being operationally configured to secure the device to the T-post; (2) a support attached to the mating surface, the support being operationally configured to secure the trail camera thereto, wherein the one or more apertures include an "H" shape, and (3) a means for tethering the trail camera to said device;
    identifying a desirable fence T-post;
    slipping the device over the top of the T-post;
    applying a biasing means to secure the female type mating surface of the device to said T-post; and
    locking the trail camera to the device via said tethering means.

* * * * *